(12) United States Patent
Lee (10) Patent No.: US 7,573,340 B2
(45) Date of Patent: Aug. 11, 2009

(54) TEMPERATURE DETECTING APPARATUS (75) Inventor: Kyong-Ha Lee, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 85 days.

(21) Appl. No.: 11/580,188

(22) Filed: Oct. 13, 2006

(65) Prior Publication Data
US 2007/0103249 A1 May 10, 2007

(30) Foreign Application Priority Data
Nov. 9, 2005 (KR) .................. 10-2005-0106968

(51) Int. Cl.
G01K 7/00 (2006.01)
G05D 23/20 (2006.01)
(52) U.S. Cl. .................. 331/66; 331/56; 374/170; 377/25; 702/130
(58) Field of Classification Search .................. 331/66, 331/176, 49, 56; 374/171, 102, 103, 163, 374/170; 377/25; 702/99, 130
See application file for complete search history.

(56) References Cited

U.S. PATENT DOCUMENTS

| 5,388,134 | A | * | 2/1995 | Douglass et al. | ............... | 377/25 |
| 5,680,359 | A | | 10/1997 | Jeong | | |
| 5,899,570 | A | * | 5/1999 | Darmawaskita et al. | ..... | 374/170 |
| 6,160,755 | A | | 12/2000 | Norman et al. | | |
| 6,695,475 | B2 | * | 2/2004 | Yin | ............... | 374/171 |
| 6,893,154 | B2 | * | 5/2005 | Gold et al. | ............... | 374/170 |
| 2007/0069875 | A1 | * | 3/2007 | Doi | ............... | 340/440 |

FOREIGN PATENT DOCUMENTS

| JP | 03231517 A | 10/1991 |
| JP | 04236517 A | 8/1992 |
| JP | 6318821 | 11/1994 |

* cited by examiner

Primary Examiner—Robert Pascal
Assistant Examiner—Levi Gannon
(74) Attorney, Agent, or Firm—Venable LLP; Jeffri A. Kaminski (57) ABSTRACT There is provided a temperature detecting apparatus for improving operational characteristics, which vary according to the temperature, of elements in a semiconductor memory device. The temperature detecting apparatus of the present invention includes: a first oscillator that outputs a first oscillating signal in response to a first oscillator reset signal, the first oscillating signal being independent of the temperature; a second oscillator that outputs a second oscillating signal in response to a second oscillator enable signal, the second oscillating signal being dependent on the temperature; a comparator that compares an output pulse of the first oscillator with an output pulse of the second oscillator and then outputs a temperature detection comparison signal; and an output unit that outputs a temperature detection signal in response to an input of the temperature detection comparison signals.

74 Claims, 7 Drawing Sheets

TEMPERATURE DETECTING APPARATUS

BACKGROUND

1. Technical Field

The present invention relates to a temperature detecting apparatus, and more particularly, to a temperature detecting apparatus for improving operational characteristics, which vary according to the temperature, of elements in a semiconductor memory device.

2. Related Art

In general, as a semiconductor memory device operates at high speed, the heat generated increases in proportion to the operation speed. For example, when the generated heat keeps increasing and thus the temperature of the semiconductor memory device reaches 85° C. or more, the semiconductor memory device stops operating, and as a result, data being processed may be lost.

Such a problem is especially serious in a mobile device. The reason is that, in most cases, a separate cooling system is not provided in the mobile device because the mobile device is small.

Further, the operation speed of the semiconductor memory device may become slow due to the ambient temperature. Especially, when the ambient temperature is lower than a proper operation temperature, the operation speed decreases. In this case, the data processing speed is not guaranteed at a reliable level.

SUMMARY

The present invention is designed to solve the above-mentioned problems, and it is an object of the present invention to provide a temperature detecting apparatus capable of controlling the operation speed according to the temperature variation of a semiconductor memory device.

Further, it is another object of the present invention to prevent an operation of the semiconductor memory device from stopping, and to guarantee the data processing speed by decreasing the operation speed when the semiconductor memory device operates at a high temperature, and by increasing the operation speed when the semiconductor memory device operates at a low temperature.

In order to achieve the above objects, in the present invention two kinds of oscillators, one of which is independent of the temperature and another of which is dependent on the temperature respectively, are used. In addition, the widths of pulses outputted from the two oscillators are compared so as to determine whether or not the semiconductor memory device is operating at a high temperature or at a low temperature, or within a normal temperature range. Then, the clock speed is changed on the basis of a temperature detection result, and thus it is possible to prevent an operation of the semiconductor memory device from stopping or to prevent the processing speed of the semiconductor memory device from decreasing.

According to an aspect of the present invention, a temperature detecting apparatus includes: a first oscillator that outputs a first oscillating signal in response to a first oscillator reset signal, the first oscillating signal being independent of the temperature; a second oscillator that outputs a second oscillating signal in response to a second oscillator enable signal, the second oscillating signal being dependent on the temperature; a comparator that compares an output pulse of the first oscillator with an output pulse of the second oscillator, and then outputs a temperature detection comparison signal; and an output unit that outputs a temperature detection signal in response to an input of the temperature detection comparison signal.

Further, according to another aspect of the present invention, a temperature detecting apparatus includes: an oscillator enable signal generation unit that generates a first oscillator reset signal and a second oscillator enable signal during a temperature detection operation; a first oscillator that outputs a first oscillating signal in response to the first oscillator reset signal, the first oscillating signal being independent of the temperature; a second oscillator that outputs a second oscillating signal in response to the second oscillator enable signal, the second oscillating signal being dependent on the temperature; an update signal generation unit that generates a temperature detection update signal for controlling the first and second oscillating signals to be outputted at the same time, and then supplies the temperature detection update signal to the oscillator enable signal generation unit; a comparator that compares the output pulses of the first and second oscillators with each other and then outputs a temperature detection comparison signal; and an output unit that outputs a temperature detection signal in response to an input of the temperature detection comparison signal.

Furthermore, according to still another aspect of the present invention, a temperature detecting apparatus includes: a start signal generation unit that generates a temperature detection start signal for starting temperature detection; an oscillator enable signal generation unit that generates a first oscillator reset signal and a second oscillator enable signal in response to the temperature detection start signal; a first oscillator that outputs a first oscillating signal in response to the first oscillator reset signal, the first oscillating signal being independent of the temperature; a second oscillator that outputs a second oscillating signal in response to the second oscillator enable signal, the second oscillating signal being dependent on the temperature; an update signal generation unit that updates a temperature detection period in response to the first oscillating signal, and that generates a temperature detection update signal for causing the first and second oscillating signals to be outputted at the same time, and then supplies the temperature detection update signal to the oscillator enable signal generation unit; a comparator that compares the output pulses of the first and second oscillators with each other and then outputs a temperature detection comparison signal; an output unit that latches the temperature detection comparison signal and then outputs the latched signal as a temperature detection signal; and a delay unit that outputs an oscillator operation completion signal for completing an operation of the second oscillator, and a reset signal for resetting the output unit in response to the comparison interval setting signal.

DESCRIPTION OF EXEMPLARY EMBODIMENTS

Hereinafter, preferred embodiments of the present invention will be described in detail with reference to the accompanying drawings.

Figure 1:
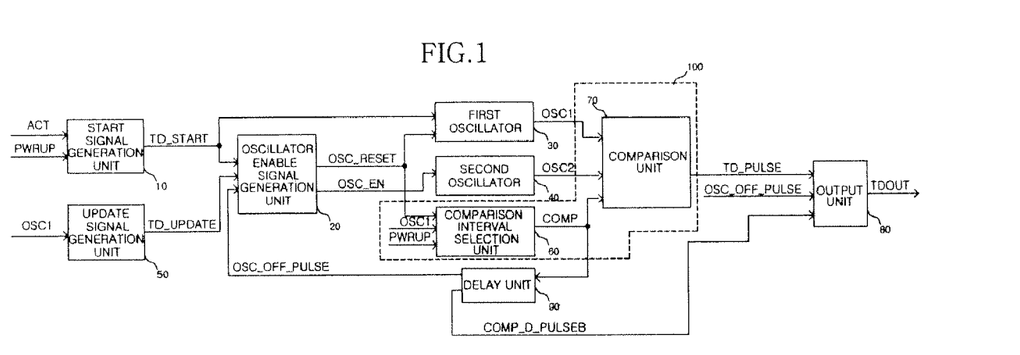
FIG. 1 is a block diagram illustrating a temperature detecting apparatus according to an embodiment of the present invention.

FIG. 1 is a block diagram illustrating a temperature detecting apparatus according to an embodiment of the present invention.

The temperature detecting apparatus according to the embodiment of the present invention includes: a start signal generation unit 10 that generates a temperature detection start signal TD_START for starting the temperature detection; an oscillator enable signal generation unit 20 that generates control signals for enabling first and second oscillators, that is, a first oscillator reset signal OSC_RESET and a second oscillator enable signal OSC_EN by using the output signal TD_START of the start signal generation unit 10; a first oscillator 30 that outputs a first oscillating signal OSC1, which is a pulse signal independent of the temperature, in response to the first oscillator reset signal OSC_RESET outputted from the oscillator enable signal generation unit 20; a second oscillator 40 that outputs a second oscillating signal OSC2, which is a temperature-dependent pulse signal, in response to the second oscillator enable signal OSC_EN outputted from the oscillator enable signal generation unit 20; an update signal generation unit 50 that updates a temperature detection period in response to the first oscillating signal OSC1 and that generates a temperature detection update signal TD_UPDATE for causing the first and second oscillators 30 and 40 to start outputting the first and second oscillating signals OSC1 and OSC2 and then supplies the temperature detection update signal TD_UPDATE to the oscillator enable signal generation unit 20; a comparator 100 that compares the output pulses of the first and second oscillators 30 and 40 with each other and then outputs a temperature detection comparison signal TD_PULSE; an output unit 80 that latches the temperature detection comparison signal TD_PULSE, which is an output signal of the comparator 100, and then outputs the latched signal as a temperature detection signal TDOUT when the comparison period of time ends; and a delay unit 90 that outputs a control signal OSC_OFF_PULSE for completing the operation of the second oscillator 40 and a control signal COMP_D_PULSEB for resetting the output unit 80 by using a comparison interval setting signal COMP.

Here, the comparator 100 includes: a comparison interval selection unit 60 that outputs the comparison interval setting signal COMP in order to set a comparison interval for comparing the output pulses of the first and second oscillators 30 and 40 with each other; and a comparison unit 70 that, during an interval while the comparison interval setting signal COMP is outputted from the comparison interval selection unit 60, compares the output pulses of the first and second oscillators 30 and 40 with each other and then outputs the temperature detection comparison signal TD_PULSE as a comparison result.

Hereinafter, an operation of the temperature detecting apparatus shown in FIG. 1 will be described.

First, when the start signal generation unit 10 is initialized by a power-up signal PWRUP and an active signal ACT is enabled, the temperature detection start signal TD_START is enabled. Then, the oscillator enable signal generation unit 20 outputs the first oscillator reset signal OSC_RESET and the second oscillator enable signal OSC_EN for driving the first and second oscillators 30 and 40.

Thereafter, the first oscillator 30 outputs the first oscillating signal OSC1 in response to the temperature detection start signal TD_START and the first oscillator reset signal OSC_RESET, and the second oscillator 40 outputs the second oscillating signal OSC2 in response to the second oscillator enable signal OSC_EN. Here, preferably, the first oscillator 30 is an oscillator independent of the temperature, and the second oscillator 40 is a temperature-dependent oscillator. In addition, as the second oscillator 40, it is possible to use either an oscillator in which the output pulse width decreases as the temperature increases, or an oscillator in which the output pulse width increases as the temperature decreases. Thus, the second oscillator 40 can perform high-temperature detection or low-temperature detection.

On the other hand, the first oscillating signal OSC1 is supplied to the update signal generation unit 50, and thus the temperature detection update signal TD_UPDATE for updating the temperature detecting apparatus is outputted from the update signal generation unit 50 and then the temperature detection update signal TD_UPDATE is inputted to the oscillator enable signal generation unit 20. Accordingly, the first oscillator reset signal OSC_RESET and the second oscillator enable signal OSC_EN are generated.

Further, the first oscillating signal OSC1 is also supplied to the comparison interval selection unit 60. The comparison interval selection unit 60 generates the comparison interval setting signal COMP by using the first oscillator reset signal OSC_RESET and the first oscillating signal OSC1.

Subsequently, the comparison unit 70 compares the first and second oscillating signals OSC1 and OSC2 while the comparison interval setting signal COMP is enabled and then outputs the temperature detection comparison signal TD_PULSE. The temperature detection comparison signal TD_PULSE is latched in the output unit 80. The temperature detection comparison signal TD_PULSE latched in the output unit 80 is outputted as the temperature detection signal TDOUT after the comparison interval setting signal COMP is disabled and then a predetermined period of time passes. Then, the output unit 80 is reset after the temperature detection signal TDOUT is outputted and then a predetermined period of time passes.

Figure 2:
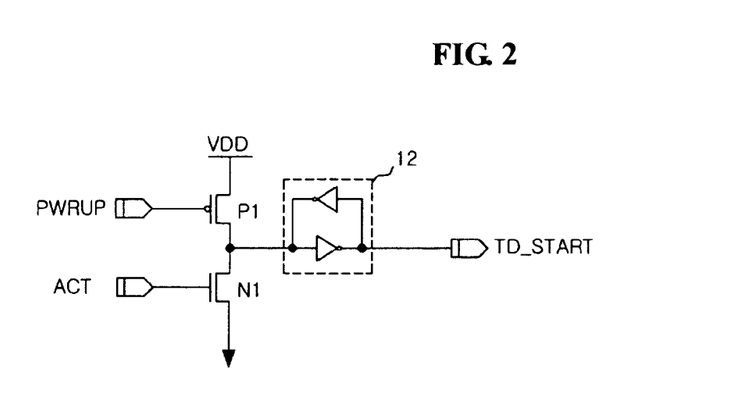
FIG. 2 is a view illustrating an example of a start signal generation unit shown in FIG. 1.

FIG. 2 is a view illustrating an example of the start signal generation unit 10 shown in FIG. 1.

The start signal generation unit 10 according to the embodiment of the present invention is initialized by the power-up signal PWRUP and outputs the temperature detection start signal TD_START in response to the active signal ACT. In addition, the start signal generation unit 10 includes: a first p-type MOS transistor P1 that is driven by the power-up signal PWRUP; a first n-type MOS transistor N1 that is driven by the active signal ACT, the first p-type MOS transistor P1 and the first n-type MOS transistor N1 being connected in series between a power supply terminal VDD and a ground terminal; and a first latch 12 that is connected between an output terminal and a connection terminal between the first p-type MOS transistor P1 and the first n-type MOS transistor N1.

When the power-up signal PWRUP is applied for the initialization, the temperature detection start signal TD_START is held at a low level. Then, when the active signal ACT is applied, the temperature detection start signal TD_START transits to a high level, which causes the temperature detecting apparatus to start operating.

Figure 3:
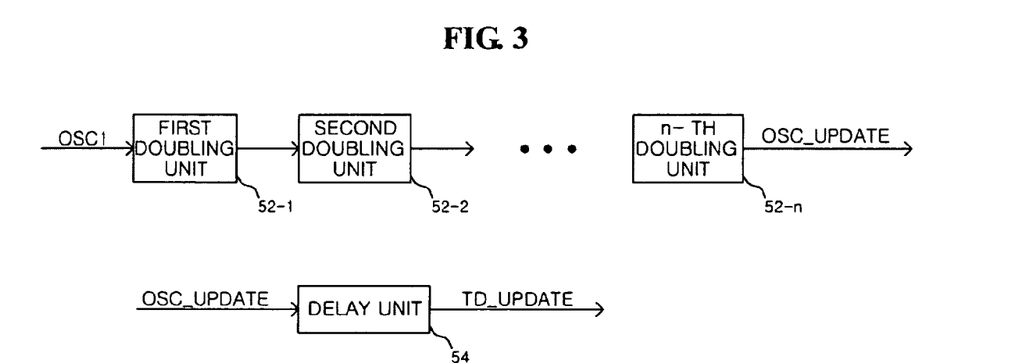
FIG. 3 is a view illustrating an example of an update signal generation unit shown in FIG. 1.

FIG. 3 is a view illustrating an example of the update signal generation unit 50 shown in FIG. 1.

The update signal generation unit 50 according to the embodiment of the present invention determines update timing of the temperature detecting apparatus in response to the first oscillating signal OSC1 and matches output timing of the first oscillating signal OSC1 and output timing of the second oscillating signal OSC2 with each other. In addition, the update signal generation unit 50 includes: at least one of a plurality of doubling units 52-1 to 52-n to which the first oscillating signal OSC1 is inputted and which double the first oscillating signal OSC1 until the first oscillating signal OSC1 has a predetermined period and then outputs an oscillator update signal OSC_UPDATE; and a first delay unit 54 that delays the oscillator update signal OSC_UPDATE by a predetermined period of time and then outputs a temperature detection update signal TD_UPDATE.

Figure 4:
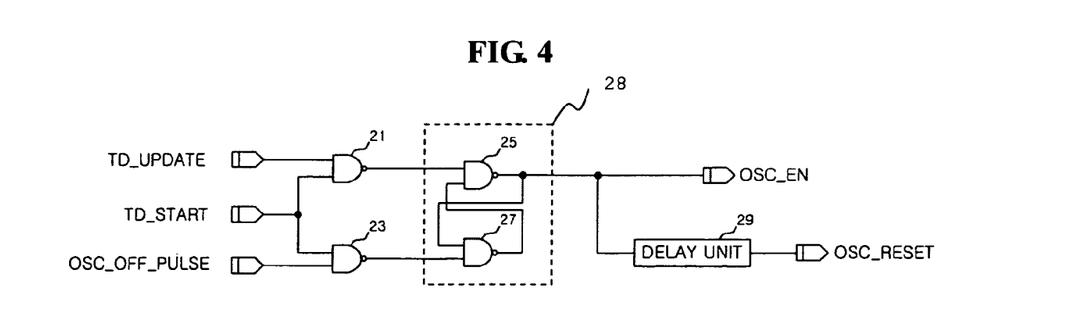
FIG. 4 is a view illustrating an example of an oscillator enable signal generation unit shown in FIG. 1.

FIG. 4 is a view illustrating an example of the oscillator enable signal generation unit 20 shown in FIG. 1.

In the case when the temperature detection start signal TD_START generated by the start signal generation unit 10 shown in FIG. 2 is enabled, that is at a high level, the oscillator enable signal generation unit 20 enables the second oscillator enable signal OSC_EN and the first oscillator reset signal OSC_RESET when the temperature detection update signal TD_UPDATE generated by the update signal generation unit 50 shown in FIG. 3 is enabled. Further, when an oscillator operation completion signal OSC_OFF_PULSE generated after the comparison interval setting signal COMP is disabled and then a predetermined period of time passes is enabled, the oscillator enable signal generation unit 20 disables the second oscillator enable signal OSC_EN so that an operation of the second oscillator 40 stops.

The oscillator enable signal generation unit 20 can be implemented by using an RS flip-flop 28 in which the temperature detection start signal TD_START is used as a clock signal, and the temperature detection update signal TD_UPDATE and the oscillator operation completion signal OSC_OFF_PULSE are used as input signals.

As shown in FIG. 4, the oscillator enable signal generation unit 20 according to the embodiment of the present invention includes: a first logic element 21 to which the temperature detection update signal TD_UPDATE and the temperature detection start signal TD_START are inputted; a second logic element 23 to which the temperature detection start signal TD_START and the oscillator operation completion signal OSC_OFF_PULSE are inputted; a third logic element 25 to which an output signal of the first logic element 21 and an output signal of a fourth logic element 27 are inputted, and which outputs the second oscillator enable signal OSC_EN; the fourth logic element 27 to which an output signal of the second logic element 23 and an output signal of the third logic element 25 are inputted; and a second delay unit 29 that delays the second oscillator enable signal OSC_EN by a predetermined period of time and then outputs the first oscillator reset signal OSC_RESET.

Here, the oscillator operation completion signal OSC_OFF_PULSE can be generated by using the comparison interval setting signal COMP, which will be described in detail later in FIG. 8.

Figure 5:
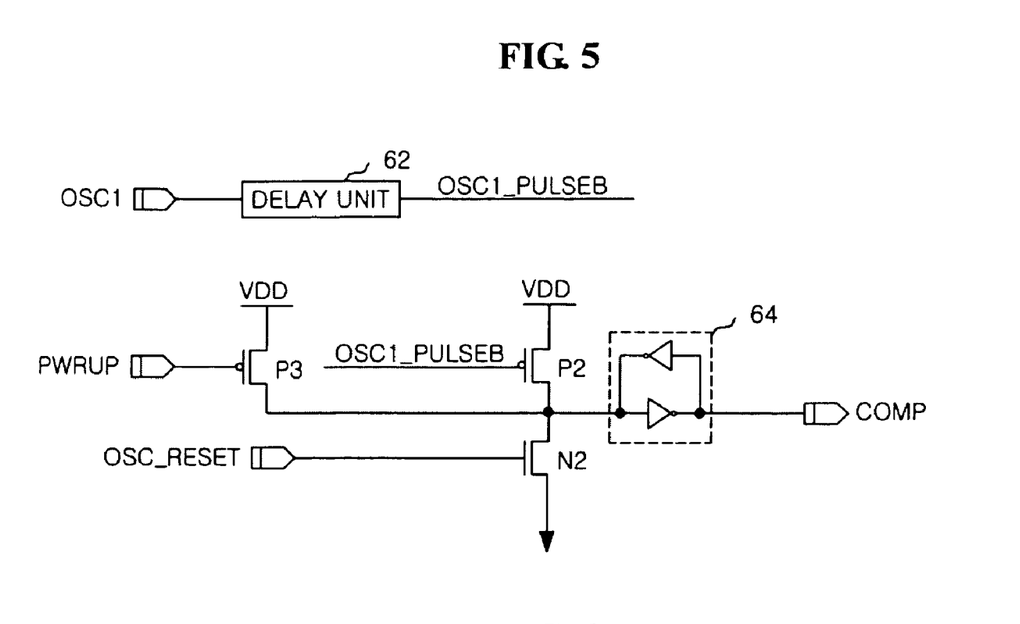
FIG. 5 is a view illustrating an example of a comparison interval selection unit shown in FIG. 1.

FIG. 5 is a view illustrating an example of the comparison interval selection unit 60 shown in FIG. 1. For example, in the case of an oscillator in which the pulse width decreases as the temperature of the second oscillator 40 increases, FIG. 5 shows a comparison interval selection unit used for a temperature detecting apparatus that detects a high temperature.

The comparison interval selection unit 60 outputs the comparison interval setting signal COMP that is enabled when the first oscillator reset signal OSC_RESET is enabled, and disabled when an inverted and delayed signal of the first oscillating signal OSC1 is enabled.

Furthermore, the comparison interval selection unit 60 includes: a second p-type MOS transistor P2 that is driven by an inverted and delayed signal OSC1_PULSEB of the first oscillating signal OSC1; a second n-type MOS transistor N2 that is driven by the first oscillator reset signal OSC_RESET, the second p-type MOS transistor P2 and the second n-type MOS transistor N2 being connected in series between the power supply terminal VDD and the ground terminal; a third p-type MOS transistor P3 that is connected between the power supply terminal VDD and a connection terminal between the second p-type MOS transistor P2 and the second n-type MOS transistor N2, and is driven by the power-up signal PWRUP; and a second latch 64 that is connected between an output terminal, from which the comparison interval setting signal COMP is outputted, and the connection terminal between the second p-type MOS transistor P2 and the second n-type MOS transistor N2. In addition, the inverted and delayed signal OSC1_PULSEB of the first oscillating signal OSC1 can be generated by inverting and delaying the first oscillating signal OSC1 by means of a third delay unit 62. Here, the inverted and delayed signal OSC1_PULSEB of the first oscillating signal OSC1 is a signal enabled at a falling edge of the first oscillating signal OSC1.

When the power-up signal PWRUP is applied and the first oscillator reset signal OSC_RESET is enabled, the comparison interval setting signal COMP becomes a high level, and accordingly, the comparison between the first and second oscillating signals OSC1 and OSC2 starts. Then, when the inverted and delayed signal OSC1_PULSEB of the first oscillating signal OSC1 is applied, the comparison interval setting signal COMP transits to a low level, and thus the comparison is completed.

In the present invention, since the inverted and delayed signal OSC1_PULSEB of the first oscillating signal OSC1 is enabled at the falling edge of the first oscillating signal OSC1, the comparison interval setting signal COMP is outputted to have a pulse width corresponding to half a period of the first oscillating signal OSC1.

Figure 6:
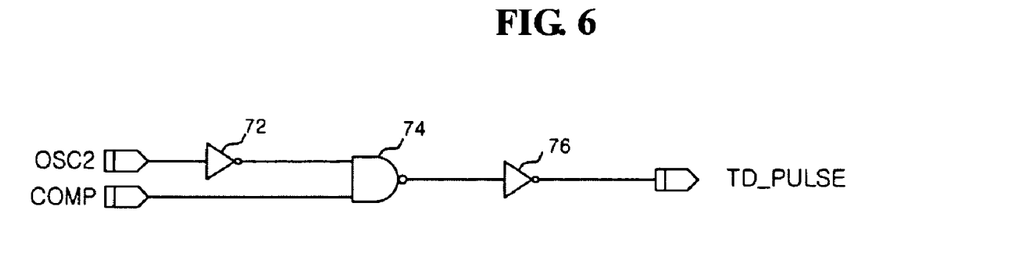
FIG. 6 is a view illustrating an example of a comparison unit shown in FIG. 1.

FIG. 6 is a view illustrating an example of the comparison unit 70 shown in FIG. 1.

In order to detect the temperature by comparing the first oscillating signals OSC1 of the first oscillator 30 with the second oscillating signal OSC2 of the second oscillator 40, the comparison unit 70 according to the embodiment of the present invention outputs the temperature detection comparison signal TD_PULSE that indicates whether or not the second oscillating signal OSC2 has the same level as the first oscillating signal OSC1 while the comparison interval setting signal COMP generated in synchronization with the first oscillating signal OSC1 is at a high level.

In particular, when the second oscillator 40 is an oscillator in which a pulse width decreases as the temperature increases, the comparison unit 70 can be implemented by using a circuit that detects whether or not the second oscillating signal OSC2 is in an enabled state while the comparison interval setting signal COMP is enabled, and thus the comparison unit 70 can perform the high-temperature detection.

In other words, as shown in FIG. 6, the comparison unit 70 according to the embodiment of the present invention includes: a fifth logic element 74 to which an inverted signal of the second oscillating signal OSC2 and the comparison interval setting signal COMP are inputted; and a first inversion unit 76 that delays an output signal of the fifth logic element 74. Here, the second oscillating signal OSC2 is inverted by a second inversion unit 72. Further, the fifth logic element 74 can be implemented by using an element that outputs a low-level signal when the input signals have the same levels, for example, a NAND gate.

Figure 7:
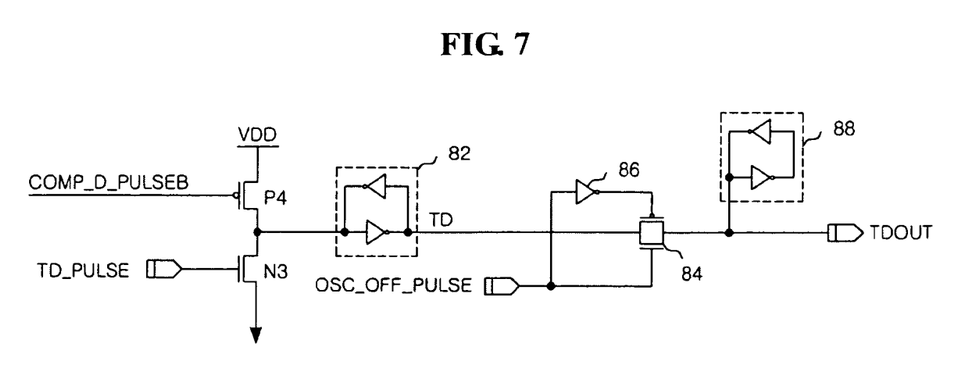
FIG. 7 is a view illustrating an example of an output unit shown in FIG. 1.

FIG. 7 is a view illustrating an example of the output unit 80 shown in FIG. 1.

In the output unit 80 according to the embodiment of the present invention, when the oscillator operation completion signal OSC_OFF_PULSE is enabled as the temperature detection comparison signal TD_PULSE is enabled, the temperature detection signal TDOUT transits to a high level, and the temperature detection signal TDOUT holds the high level state until the reset signal COMP_D_PULSEB is enabled.

Further, the output unit 80 according to the embodiment of the present invention includes: a fourth p-type MOS transistor P4 that is driven by the reset signal COMP_D_PULSEB; a third n-type MOS transistor N3 that is driven by the temperature detection comparison signal TD_PULSE, the fourth p-type MOS transistor P4 and the third n-type MOS transistor N3 being connected in series between the power supply terminal VDD and the ground terminal; a third latch 82 that is connected to a connection terminal between the fourth p-type MOS transistor P4 and the third n-type MOS transistor N3; a first transfer gate 84 that is connected to an output terminal TD of the third latch 82 and is driven by the oscillator operation completion signal OSC_OFF_PULSE; and a fourth latch 88 that is connected between the first transfer gate 84 and an output terminal. Here, reference numeral 86 that has not been explained represents an inversion unit for driving the transfer gate 84.

When the temperature detection comparison signal TD_PULSE becomes high level, the third n-type MOS transistor N3 is turned on, and accordingly, a high-level signal is outputted from the third latch 82. Then, as the oscillator operation completion signal OSC_OFF_PULSE becomes high level, the transfer gate 84 is turned on, and accordingly, the high-level signal is outputted as the temperature detection signal TDOUT from the fourth latch 88. Then, when the fourth p-type MOS transistor P4 is turned on by the reset signal COMP_D_PULSEB, the temperature detection signal TDOUT transits to a low level, and thus an output of the temperature detection signal TDOUT is completed.

Figure 8:
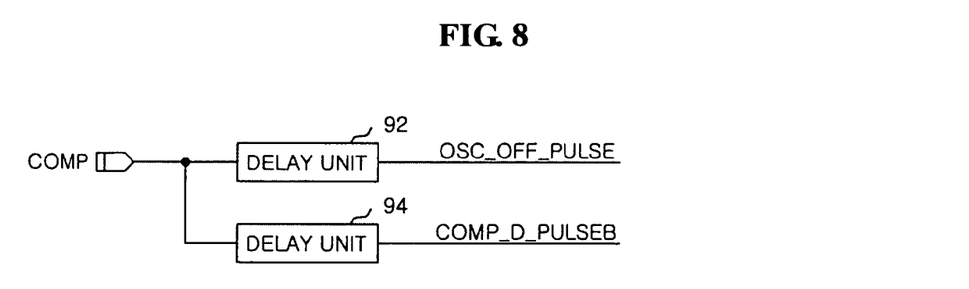
FIG. 8 is a view illustrating an example of a delay unit shown in FIG. 1.

FIG. 8 is a view illustrating an example of the delay unit 90 shown in FIG. 1.

The delay unit 90 according to the embodiment of the present invention includes: a fourth delay unit 92 that generates the oscillator operation completion signal OSC_OFF_PULSE by using the comparison interval setting signal COMP; and a fifth delay unit 94 that generates the reset signal COMP_D_PULSEB by using the comparison interval setting signal COMP. Here, the fourth delay unit 92 generates the oscillator operation completion signal OSC_OFF_PULSE after a delayed signal of the comparison interval setting signal COMP is disabled and then a predetermined period of time passes, thereby completing the operations of the first and second oscillators 30 and 40. In addition, the fifth delay unit 94 delays the comparison interval setting signal COMP by a period of time longer than in the fourth delay unit 92 and then generates the reset signal COMP_D_PULSEB after the oscillator operation completion signal OSC_OFF_PULSE is disabled, thereby completing the temperature detection operation.

Figure 9:
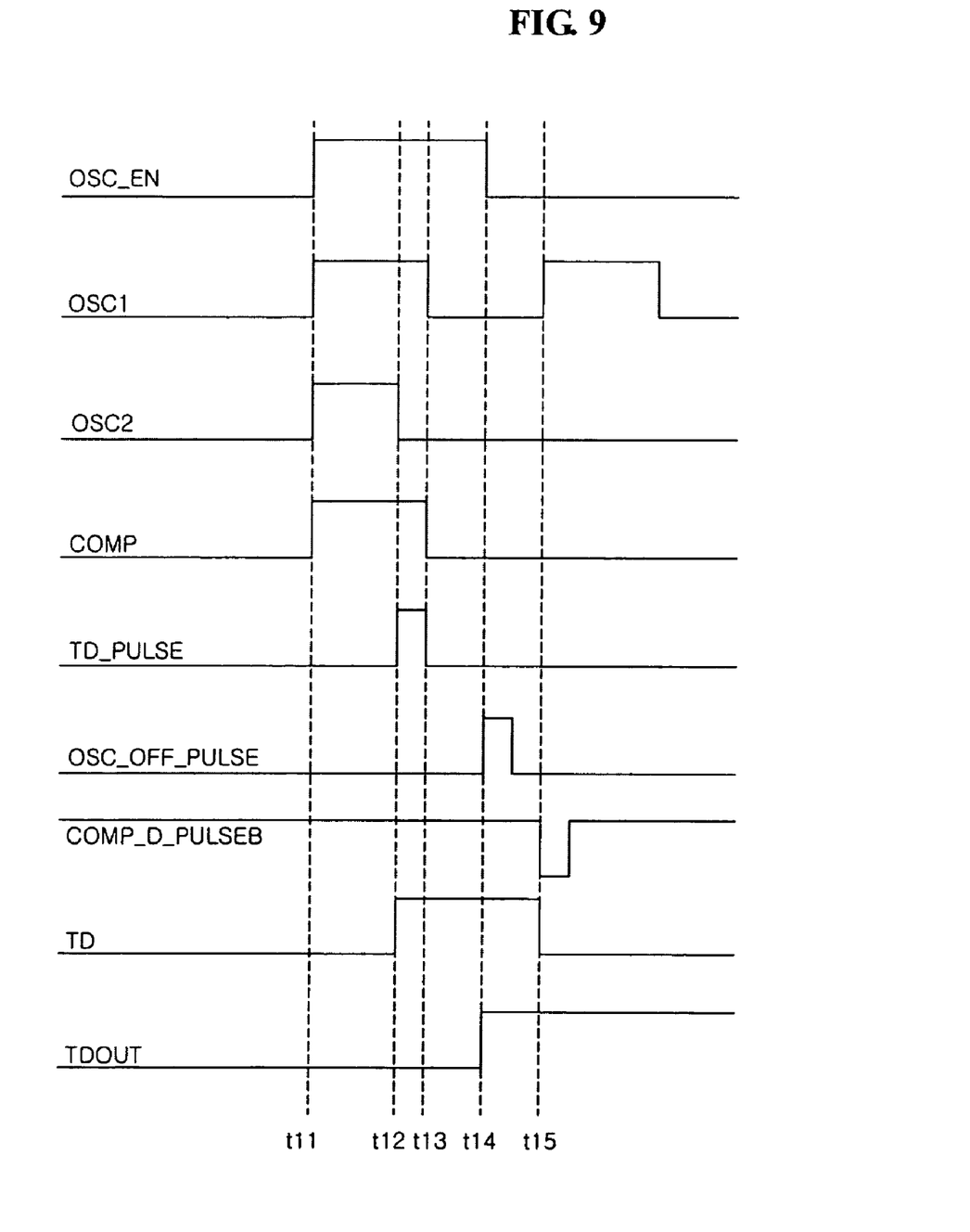
FIG. 9 is a timing diagram illustrating an example of an operation of the temperature detecting apparatus according to the embodiment of the present invention.

FIG. 9 is a timing diagram illustrating an example of an operation of the temperature detecting apparatus according to the embodiment of the present invention. Here, FIG. 9 shows a case in which a high temperature is detected when the second oscillator 40 is an oscillator in which a pulse width decreases as the temperature increases.

When the second oscillator enable signal OSC_EN is enabled at a first time t11, the first oscillating signal OSC1 and the second oscillating signal OSC2 are outputted. At this time, when the temperature of a semiconductor memory device is high, the second oscillating signal OSC2 is outputted as a signal having a pulse width smaller than that of the first oscillating signal OSC1.

Thereafter, when the comparison interval setting signal COMP generated in synchronization with the first oscillating signal OSC1 is enabled, the temperature detection comparison signal TD_PULSE is outputted during a comparison interval. At this time, since the pulse width of the second oscillating signal OSC2 is smaller than that of the first oscillating signal OSC1, the temperature detection comparison signal TD_PULSE is outputted at a second time t12. Accordingly, an output signal, which is outputted from the output terminal TD of the third latch 82 of the output unit 80 shown in FIG. 7, transits to a high level. Then, when the temperature detection comparison signal TD_PULSE is disabled at a third time t13 and the oscillator operation completion signal OSC_OFF_PULSE is enabled at a fourth time t14, the output signal of the third latch 82 is outputted as the temperature detection signal TDOUT through the fourth latch 88.

Subsequently, when the reset signal COMP_D_PULSEB is enabled as a low-level signal at a fifth time t15, the output signal of the third latch 82 is disabled and transits to a low level, and thus the temperature detection operation is completed.

Figure 10:
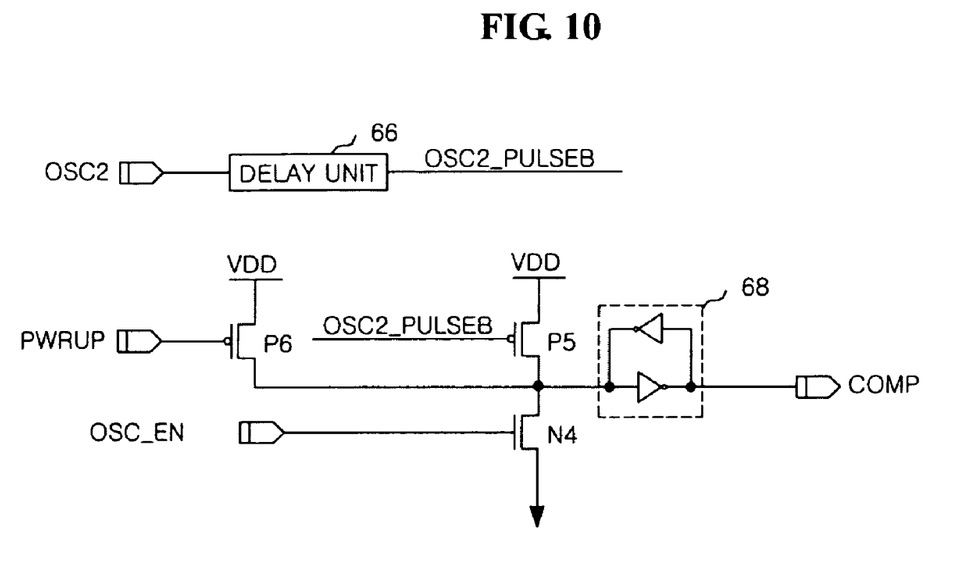
FIG. 10 is a view illustrating another example of the comparison interval selection unit shown in FIG. 1.

FIG. 10 is a view illustrating another example of the comparison interval selection unit 60 shown in FIG. 1. For example, FIG. 10 shows a comparison interval selection unit used for a temperature detecting apparatus that detects a low temperature when the second oscillator 40 is an oscillator in which a pulse width increases as the temperature decreases.

The comparison interval selection unit 60 outputs the comparison interval setting signal COMP that is enabled when the second oscillator enable signal OSC_EN is enabled and disabled when an inverted and delayed signal of the second oscillating signal OSC2 is enabled.

The comparison interval selection unit 60 includes: a fifth p-type MOS transistor P5 that is driven by an inverted and delayed signal OSC2_PULSEB of the second oscillating signal OSC2; a fourth n-type MOS transistor N4 that is driven by the second oscillator enable signal OSC_EN, the fifth p-type MOS transistor P5 and the fourth n-type MOS transistor N4 being connected in series between the power supply terminal VDD and the ground terminal; a sixth p-type MOS transistor P6 that is connected between the power supply terminal VDD and a connection terminal between the fifth p-type MOS transistor P5 and the fourth n-type MOS transistor N4 and is driven by the power-up signal PWRUP; and a fifth latch 68 that is connected between an output terminal, from which the comparison interval setting signal COMP is outputted, and the connection terminal between the fifth p-type MOS transistor P5 and the fourth n-type MOS transistor N4. In addition, the inverted and delayed signal OSC2_PULSEB of the second oscillating signal OSC2 can be generated by inverting and delaying the second oscillating signal OSC2 by means of a sixth delay unit 66. Here, the inverted and delayed signal OSC2_PULSEB of the second oscillating signal OSC2 is a signal enabled at a falling edge of the second oscillating signal OSC2.

When the power-up signal PWRUP for initializing the comparison interval selection unit 60 is applied and the second oscillator enable signal OSC_EN is enabled, the comparison interval setting signal COMP is enabled, that is, becomes high level, and accordingly, the comparison between the first and second oscillating signals OSC1 and OSC2 starts. Then, when the inverted and delayed signal OSC2_PULSEB of the second oscillating signal OSC2 is applied, the comparison interval setting signal COMP transits to a low level, and thus the comparison is completed.

In the present invention, since the inverted and delayed signal OSC2_PULSEB of the second oscillating signal OSC2 is enabled at the falling edge of the second oscillating signal OSC2, the comparison interval setting signal COMP is outputted to have a pulse width corresponding to half a period of the second oscillating signal OSC2.

In the case in which the comparison interval selection unit 60 is implemented as shown in FIG. 10, the comparison unit 70 outputs the temperature detection comparison signal TD_PULSE that indicates whether or not the first oscillating signal OSC1 holds the same level while the comparison interval setting signal COMP generated in synchronization with the second oscillating signal OSC2 is at a high level. That is, referring back to FIG. 6, the comparison unit 70 generates the temperature detection comparison signal TD_PULSE by using the first oscillating signal OSC1 and the comparison interval setting signal COMP as input signals of the logic element 74.

In particular, when the second oscillator 40 is an oscillator in which a pulse width increases as the temperature decreases, the comparison unit 70 can be implemented by using a circuit that detects whether or not the first oscillating signal OSC1 holds the same level while the comparison interval setting signal COMP is enabled, and thus the comparison unit 70 can perform the low-temperature detection.

Figure 11:
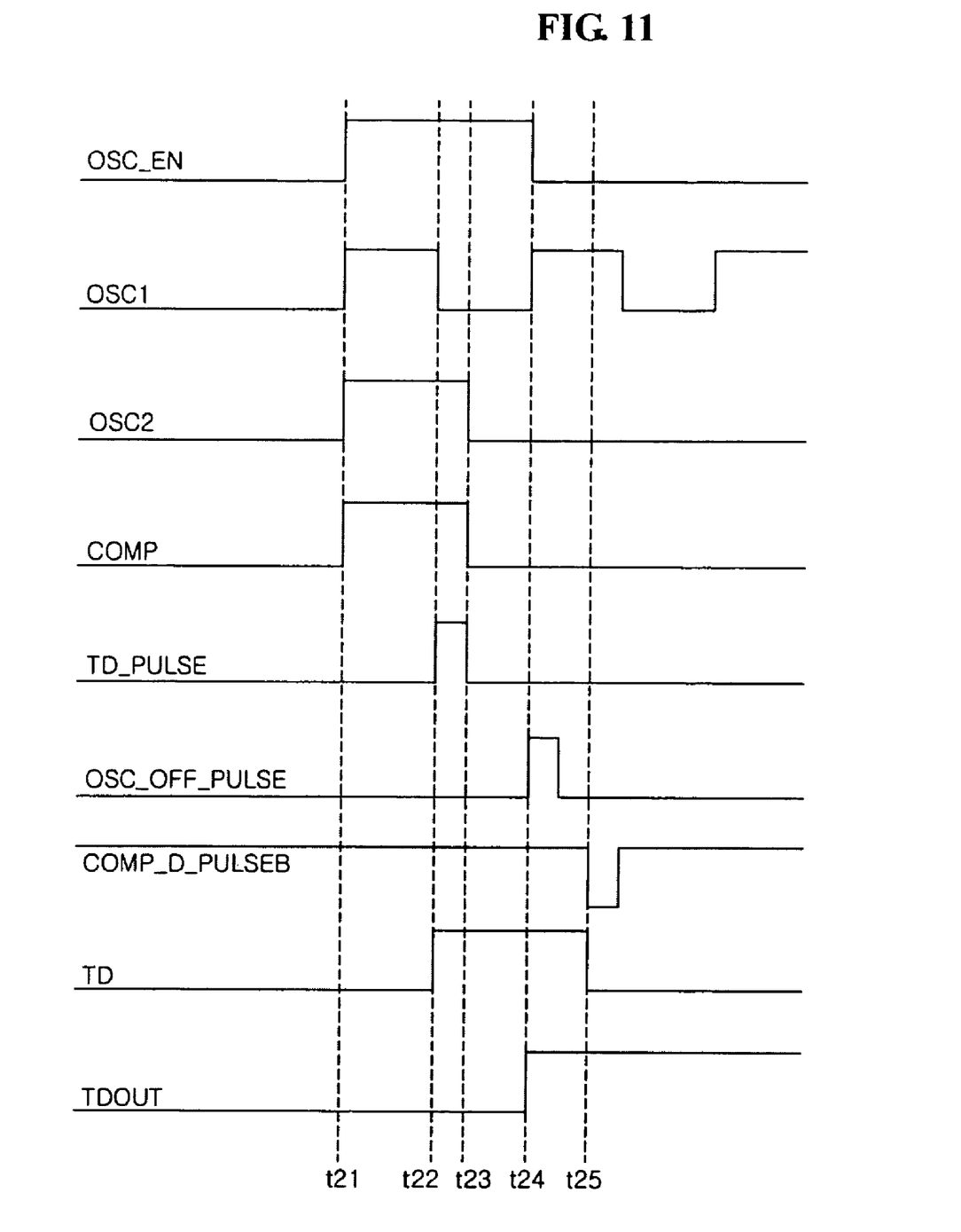
FIG. 11 is a timing diagram illustrating another example of an operation of the temperature detecting apparatus according to the embodiment of the present invention.

FIG. 11 is a timing diagram illustrating another example of an operation of the temperature detecting apparatus according to the embodiment of the present invention.

When the second oscillator enable signal OSC_EN is enabled at a first time t21, the first oscillating signal OSC1 and the second oscillating signal OSC2 are outputted. At this time, when the temperature of a semiconductor memory device is low, the second oscillating signal OSC2 is outputted as a signal having a pulse width larger than that of the first oscillating signal OSC1.

Thereafter, when the comparison interval setting signal COMP generated in synchronization with the second oscillating signal OSC2 is enabled, the temperature detection comparison signal TD_PULSE is outputted during the comparison interval. At this time, since the pulse width of the second oscillating signal OSC2 is larger than that of the first oscillating signal OSC1, the temperature detection comparison signal TD_PULSE is outputted as a high-level signal at a second time t22. Accordingly, the output signal of the third latch 82 of the output unit 80 shown in FIG. 7 transits to a high level. Then, when the temperature detection comparison signal TD_PULSE is disabled at a third time t23 and the oscillator operation completion signal OSC_OFF_PULSE becomes high level at a fourth time t24, the output signal of the third latch 82 is outputted as the temperature detection signal TDOUT through the fourth latch 88.

Subsequently, when the reset signal COMP_D_PULSEB is enabled as a low-level signal at a fifth time t25, the output signal of the third latch 82 transits to a low level, and thus the temperature detection operation is completed.

In the preferred embodiment of the present invention, the first to fourth logic elements can be implemented by using a NAND gate. However, the present invention is not limited thereto.

Further, in the present invention, at least one of the comparison interval selection unit shown in FIG. 5 and the comparison interval selection unit shown in FIG. 10 can be used to detect the temperature of a semiconductor memory device. In addition, when both the comparison interval selection unit shown in FIG. 5 and the comparison interval selection unit shown in FIG. 10 are used, it is possible to perform both the high-temperature detection and the low-temperature detection by connecting the comparison interval selection unit shown in FIG. 5 and the comparison interval selection unit shown in FIG. 10 in parallel to each other.

As described above, in the invention, since the temperature of the semiconductor memory device is detected and then the clock speed is changed on the basis of the detected temperature, it is possible to decrease the operation speed when the semiconductor memory device operates at a high temperature and to increase the operation speed when the semiconductor memory device operates at a low temperature. Thus, the operational characteristic of the semiconductor memory device is improved, and as a result, the reliability of the semiconductor memory device is improved.

Although the present invention has been described in connection with the exemplary embodiments of the present invention, it will be apparent to those skilled in the art that various modifications and changes may be made thereto without departing from the scope and spirit of the present invention. Therefore, it should be understood that the above embodiments are not limitative but illustrative in all aspects. In addition, the scope of the present invention is defined by the appended claims rather than by the above exemplary embodiments, and all changes that fall within the metes and bounds of the claims, or equivalents of such metes and bounds are therefore intended to be embraced by the claims.

What is claimed is:

1. A temperature detecting apparatus comprising:
   a first oscillator that outputs a first oscillating signal in response to a first oscillator reset signal, the first oscillating signal being independent of the temperature;
   a second oscillator that outputs a second oscillating signal in response to a second oscillator enable signal, the second oscillating signal being dependent on the temperature;
   a comparator that compares an output pulse of the first oscillator with an output pulse of the second oscillator in response to a comparison interval setting signal generated by the first oscillator reset signal that is generated according to the first oscillating signal and the first oscillating signal, and then outputs a temperature detection comparison signal; and
   an output unit that outputs a temperature detection signal in response to an input of the temperature detection comparison signal.

2. The temperature detecting apparatus of claim 1,
wherein the comparator includes:
a comparison interval selection unit that outputs the comparison interval setting signal for setting a comparison interval; and
a comparison unit that, during the comparison interval, compares the first and second oscillating signals with each other and then outputs the temperature detection comparison signal.

3. The temperature detecting apparatus of claim 2,
wherein the comparison interval selection unit generates the comparison interval setting signal that is enabled when the first oscillator reset signal is enabled and disabled when an inverted and delayed signal of the first oscillating signal is enabled.

4. The temperature detecting apparatus of claim 3,
wherein the comparison interval selection unit includes:
a first MOS transistor and a second MOS transistor that are connected in series between a power supply terminal and a ground terminal, the first MOS transistor being driven by the inverted and delayed signal of the first oscillating signal and the second MOS transistor being driven by the first oscillator reset signal; and
a third MOS transistor that is connected between the power supply terminal and a connection terminal between the first and second MOS transistors and is driven by a power-up signal.

5. The temperature detecting apparatus of claim 4,
wherein the inverted and delayed signal of the first oscillating signal is generated by inverting and delaying the first oscillating signal by means of a delay unit so as to be enabled at a falling edge of the first oscillating signal.

6. The temperature detecting apparatus of claim 2,
wherein the comparison interval selection unit includes:
a first MOS transistor and a second MOS transistor that are connected in series between a power supply terminal and a ground terminal, the first MOS transistor being driven by the inverted and delayed signal of the first oscillating signal and the second MOS transistor being driven by the first oscillator reset signal; and
a third MOS transistor that is connected between the power supply terminal and a connection terminal between the first and second MOS transistors and is driven by a power-up signal.

7. The temperature detecting apparatus of claim 6,
wherein the inverted and delayed signal of the first oscillating signal is generated by inverting and delaying the first oscillating signal by means of a delay unit so as to be enabled at a falling edge of the first oscillating signal.

8. The temperature detecting apparatus of claim 2,
wherein the comparison unit outputs the temperature detection comparison signal indicating whether or not the second oscillating signal has the same level as the comparison interval setting signal while the comparison interval setting signal generated in synchronization with the first oscillating signal is high level.

9. The temperature detecting apparatus of claim 8,
wherein the comparison unit includes a logic element to which an inverted signal of the second oscillating signal and the comparison interval setting signal are inputted.

10. The temperature detecting apparatus of claim 9,
wherein the comparison unit further includes an inversion unit that inverts an output signal of the logic element.

11. The temperature detecting apparatus of claim 2,
wherein the comparison unit includes a logic element to which an inverted signal of the second oscillating signal and the comparison interval setting signal are inputted.

12. The temperature detecting apparatus of claim 11,
wherein the comparison unit further includes an inversion unit that inverts an output signal of the logic element.

13. The temperature detecting apparatus of claim 2, further comprising:
a delay unit that outputs an oscillator operation completion signal for completing an operation of the second oscillator in response to the comparison interval setting signal.

14. The temperature detecting apparatus of claim 13,
wherein the output unit outputs the temperature detection signal when the temperature detection comparison signal is enabled and then the oscillator operation completion signal is enabled.

15. The temperature detecting apparatus of claim 14,
wherein the output unit includes:
a first MOS transistor and a second MOS transistor that are connected in series between a power supply terminal and a ground terminal, the first MOS transistor being driven by a reset signal and the second MOS transistor being driven by the temperature detection comparison signal; and
a transfer gate that is connected to a connection terminal between the first and second MOS transistors and is driven by an oscillator operation completion signal.

16. The temperature detecting apparatus of claim 1,
wherein the output unit includes:
a first MOS transistor and a second MOS transistor that are connected in series between a power supply terminal and a ground terminal, the first MOS transistor being driven by a reset signal and the second MOS transistor being driven by the temperature detection comparison signal; and
a transfer gate that is connected to a connection terminal between the first and second MOS transistors and is driven by an oscillator operation completion signal.

17. A temperature detecting apparatus comprising:
an oscillator enable signal generation unit that generates a first oscillator reset signal and a second oscillator enable signal during a temperature detection operation;
a first oscillator that outputs a first oscillating signal in response to the first oscillator reset signal, the first oscillating signal being independent of the temperature;
a second oscillator that outputs a second oscillating signal in response to the second oscillator enable signal, the second oscillating signal being dependent on the temperature;
an update signal generation unit that generates a temperature detection update signal for controlling the first and second oscillating signals to be outputted at the same time and then supplies the temperature detection update signal to the oscillator enable signal generation unit;
a comparator that compares the output pulses of the first and second oscillators with each other in response to a comparison interval setting signal generated by the first oscillator reset signal that is generated according to the first oscillating signal and the first oscillating signal and then outputs a temperature detection comparison signal; and
an output unit that outputs a temperature detection signal in response to an input of the temperature detection comparison signal.

18. The temperature detecting apparatus of claim 17,
wherein, in a state in which a temperature detection start signal is enabled, the oscillator enable signal generation unit enables the second oscillator enable signal and the first oscillator reset signal when the temperature detection update signal is enabled and disables the second oscillator enable signal when an oscillator operation completion signal is enabled.

19. The temperature detecting apparatus of claim 18, wherein the oscillator enable signal generation unit is an RS flip-flop in which the temperature detection start signal is used as a clock signal, and the temperature detection update signal and the oscillator operation completion signal are used as input signals.

20. The temperature detecting apparatus of claim 18, wherein the oscillator enable signal generation unit includes:
a first logic element to which the temperature detection update signal and the temperature detection start signal are inputted;
a second logic element to which the temperature detection start signal and the oscillator operation completion signal are inputted;
a third logic element to which an output signal of the first logic element and an output signal of a fourth logic element are inputted and which outputs the second oscillator enable signal;
the fourth logic element to which an output signal of the second logic element and an output signal of the third logic element are inputted; and
a second delay unit that delays the second oscillator enable signal by a predetermined period of time and then outputs the first oscillator reset signal.

21. The temperature detecting apparatus of, claim 18, wherein the output unit outputs the temperature detection signal when the temperature detection comparison signal is enabled and then the oscillator operation completion signal is enabled.

22. The temperature detecting apparatus of claim 21, wherein the output unit includes:
a first MOS transistor and a second MOS transistor that are connected in series between a power supply terminal and a ground terminal, the first MOS transistor being driven by a reset signal and the second MOS transistor being driven by the temperature detection comparison signal; and
a transfer gate that is connected to a connection terminal between the first and second MOS transistors and is driven by an oscillator operation completion signal.

23. The temperature detecting apparatus of claim 17, wherein the oscillator enable signal generation unit is an RS flip-flop in which a temperature detection start signal is used as a clock signal, and the temperature detection update signal and an oscillator operation completion signal are used as input signals.

24. The temperature detecting apparatus of claim 17, wherein the oscillator enable signal generation unit includes:
a first logic element to which the temperature detection update signal and a temperature detection start signal are inputted;
a second logic element to which the temperature detection start signal and an oscillator operation completion signal are inputted;
a third logic element to which an output signal of the first logic element and an output signal of a fourth logic element are inputted and which outputs the second oscillator enable signal;
the fourth logic element to which an output signal of the second logic element and an output signal of the third logic element are inputted; and
a second delay unit that delays the second oscillator enable signal by a predetermined period of time and then outputs the first oscillator reset signal.

25. The temperature detecting apparatus of claim 17, wherein the comparator includes:
a comparison interval selection unit that outputs the comparison interval setting signal for setting a comparison interval; and
a comparison unit that, during the comparison interval, compares the first and second oscillating signals with each other and then outputs the temperature detection comparison signal.

26. The temperature detecting apparatus of claim 25, wherein the comparison interval selection unit generates the comparison interval setting signal that is enabled when the first oscillator reset signal is enabled and disabled when an inverted and delayed signal of the first oscillating signal is enabled.

27. The temperature detecting apparatus of claim 26, wherein the comparison interval selection unit includes:
a first MOS transistor and a second MOS transistor that are connected in series between a power supply terminal and a ground terminal, the first MOS transistor being driven by the inverted and delayed signal of the first oscillating signal and the second MOS transistor being driven by the first oscillator reset signal; and
a third MOS transistor that is connected between the power supply terminal and a connection terminal between the first and second MOS transistors and is driven by a power-up signal.

28. The temperature detecting apparatus of claim 27, wherein the inverted and delayed signal of the first oscillating signal is generated by inverting and delaying the first oscillating signal by means of a delay unit so as to be enabled at a falling edge of the first oscillating signal.

29. The temperature detecting apparatus of claim 25, wherein the comparison interval selection unit includes:
a first MOS transistor and a second MOS transistor that are connected in series between a power supply terminal and a ground terminal, the first MOS transistor being driven by the inverted and delayed signal of the first oscillating signal and the second MOS transistor being driven by the first oscillator reset signal; and
a third MOS transistor that is connected between the power supply terminal and a connection terminal between the first and second MOS transistors and is driven by a power-up signal.

30. The temperature detecting apparatus of claim 29, wherein the inverted and delayed signal of the first oscillating signal is generated by inverting and delaying the first oscillating signal by means of a delay unit so as to be enabled at a falling edge of the first oscillating signal.

31. The temperature detecting apparatus of claim 25, wherein the comparison unit outputs the temperature detection comparison signal indicating whether or not the second oscillating signal has the same level as the comparison interval setting signal while the comparison interval setting signal generated in synchronization with the first oscillating signal is at a high level.

32. The temperature detecting apparatus of claim 31, wherein the comparison unit includes a logic element to which an inverted signal of the second oscillating signal and the comparison interval setting signal are inputted.

33. The temperature detecting apparatus of claim 32, wherein the comparison unit further includes an inversion unit that inverts an output signal of the logic element.

34. The temperature detecting apparatus of claim 25,
wherein the comparison unit includes a logic element to which an inverted signal of the second oscillating signal and the comparison interval setting signal are inputted.

35. The temperature detecting apparatus of claim 34,
wherein the comparison unit further includes an inversion unit that inverts an output signal of the logic element.

36. The temperature detecting apparatus of claim 25, further comprising:
a delay unit that outputs an oscillator operation completion signal for completing an operation of the second oscillator in response to the comparison interval setting signal.

37. The temperature detecting apparatus of claim 17,
wherein the output unit includes:
a first MOS transistor and a second MOS transistor that are connected in series between a power supply terminal and a ground terminal, the first MOS transistor being driven by a reset signal and the second MOS transistor being driven by the temperature detection comparison signal; and
a transfer gate that is connected to a connection terminal between the first and second MOS transistors and is driven by an oscillator operation completion signal.

38. A temperature detecting apparatus comprising:
a start signal generation unit that generates a temperature detection start signal for starting temperature detection;
an oscillator enable signal generation unit that generates a first oscillator reset signal and a second oscillator enable signal in response to the temperature detection start signal;
a first oscillator that outputs a first oscillating signal in response to the first oscillator reset signal, the first oscillating signal being independent of the temperature;
a second oscillator that outputs a second oscillating signal in response to the second oscillator enable signal, the second oscillating signal being dependent on the temperature;
an update signal generation unit that updates a temperature detection period in response to the first oscillating signal and that generates a temperature detection update signal for causing the first and second oscillating signals to be outputted at the same time, and then supplies the temperature detection update signal to the oscillator enable signal generation unit;
a comparator that compares the output pulses of the first and second oscillators with each other and then outputs a temperature detection comparison signal;
an output unit that latches the temperature detection comparison signal and then outputs the latched signal as a temperature detection signal; and
a delay unit that outputs an oscillator operation completion signal for completing an operation of the second oscillator and a reset signal for resetting the output unit in response to the comparison interval setting signal.

39. The temperature detecting apparatus of claim 38,
wherein the comparator includes:
a comparison interval selection unit that outputs a comparison interval setting signal for comparing the output pulses of the first and second oscillators with each other; and
a comparison unit that, during an interval while the comparison interval setting signal is outputted, compares the first and second oscillating signals with each other and then outputs the temperature detection comparison signal.

40. The temperature detecting apparatus of claim 39,
wherein the comparison interval selection unit generates the comparison interval setting signal that is enabled when the first oscillator reset signal is enabled and disabled when an inverted and delayed signal of the first oscillating signal is enabled.

41. The temperature detecting apparatus of claim 40,
wherein the comparison interval selection unit includes:
a first MOS transistor and a second MOS transistor that are connected in series between a power supply terminal and a ground terminal, the first MOS transistor being driven by the inverted and delayed signal of the first oscillating signal and the second MOS transistor being driven by the first oscillator reset signal; and
a third MOS transistor that is connected between the power supply terminal and a connection terminal between the first and second MOS transistors and is driven by a power-up signal.

42. The temperature detecting apparatus of claim 41,
wherein the inverted and delayed signal of the first oscillating signal is generated by inverting and delaying the first oscillating signal by means of a delay unit so as to be enabled at a falling edge of the first oscillating signal.

43. The temperature detecting apparatus of claim 39,
wherein the comparison interval selection unit includes:
a first MOS transistor and a second MOS transistor that are connected in series between a power supply terminal and a ground terminal, the first MOS transistor being driven by the inverted and delayed signal of the first oscillating signal and the second MOS transistor being driven by the first oscillator reset signal; and
a third MOS transistor that is connected between the power supply terminal and a connection terminal between the first and second MOS transistors and is driven by a power-up signal.

44. The temperature detecting apparatus of claim 43,
wherein the inverted and delayed signal of the first oscillating signal is generated by inverting and delaying the first oscillating signal by means of a delay unit so as to be enabled at a falling edge of the first oscillating signal.

45. The temperature detecting apparatus of claim 39,
wherein the comparison unit outputs the temperature detection comparison signal indicating whether or not the second oscillating signal has the same level as the comparison interval setting signal while the comparison interval setting signal generated in synchronization with the first oscillating signal is at a high level.

46. The temperature detecting apparatus of claim 45,
wherein the comparison unit includes a logic element to which an inverted signal of the second oscillating signal and the comparison interval setting signal are inputted.

47. The temperature detecting apparatus of claim 46,
wherein the comparison unit further includes an inversion unit that inverts an output signal of the logic element.

48. The temperature detecting apparatus of claim 39,
wherein the comparison unit includes a logic element to which an inverted signal of the second oscillating signal and the comparison interval setting signal are inputted.

49. The temperature detecting apparatus of claim 48,
wherein the comparison unit further includes an inversion unit that inverts an output signal of the logic element.

50. The temperature detecting apparatus of claim 39,
wherein the comparison interval selection unit generates the comparison interval setting signal that is enabled when the second oscillator enable signal is enabled and disabled when an inverted and delayed signal of the second oscillating signal is enabled.

51. The temperature detecting apparatus of claim 50, wherein the comparison interval selection unit includes:

a first MOS transistor and a second MOS transistor that are connected in series between a power supply terminal and a ground terminal, the first MOS transistor being driven by the inverted and delayed signal of the second oscillating signal and the second MOS transistor being driven by the second oscillator enable signal; and a third MOS transistor that is connected between the power supply terminal and a connection terminal between the first and second MOS transistors and is driven by a power-up signal.

52. The temperature detecting apparatus of claim 51, wherein the inverted and delayed signal of the second oscillating signal is generated by inverting and delaying the second oscillating signal by means of a delay unit so as to be enabled at a falling edge of the second oscillating signal.

53. The temperature detecting apparatus of claim 39, wherein the comparison interval selection unit includes:

a first MOS transistor and a second MOS transistor that are connected in series between a power supply terminal and a ground terminal, the first MOS transistor being driven by an inverted and delayed signal of the second oscillating signal and the second MOS transistor being driven by the second oscillator enable signal; and a third MOS transistor that is connected between the power supply terminal and a connection terminal between the first and second MOS transistors and is driven by a power-up signal.

54. The temperature detecting apparatus of claim 53, wherein the inverted and delayed signal of the second oscillating signal is generated by inverting and delaying the second oscillating signal by means of a delay unit so as to be enabled at a falling edge of the second oscillating signal.

55. The temperature detecting apparatus of claim 39, wherein the comparison unit outputs the temperature detection comparison signal indicating whether or not the first oscillating signal has the same level as the comparison interval setting signal while the comparison interval setting signal generated in synchronization with the second oscillating signal is at a high level.

56. The temperature detecting apparatus of claim 55, wherein the comparison-unit includes a logic element to which an inverted signal of the first oscillating signal and the comparison interval setting signal are inputted.

57. The temperature detecting apparatus of claim 56, wherein the comparison unit further includes an inversion unit that inverts an output signal of the logic element.

58. The temperature detecting apparatus of claim 39, wherein the comparison unit includes a logic element to which an inverted signal of the first oscillating signal and the comparison interval setting signal are inputted.

59. The temperature detecting apparatus of claim 58, wherein the comparison unit further includes an inversion unit that inverts an output signal of the logic element.

60. The temperature detecting apparatus of claim 38, wherein the output unit outputs the temperature detection signal when the temperature detection comparison signal is enabled and then the oscillator operation completion signal is enabled.

61. The temperature detecting apparatus of claim 60, wherein the output unit includes:

a first MOS transistor and a second MOS transistor that are connected in series between a power supply terminal and a ground terminal, the first MOS transistor being driven by the reset signal and the second MOS transistor being driven by the temperature detection comparison signal; and a transfer gate that is connected to a connection terminal between the first and second MOS transistors and is driven by the oscillator operation completion signal.

62. The temperature detecting apparatus of claim 38, wherein the output unit includes:

a first MOS transistor and a second MOS transistor that are connected in series between a power supply terminal and a ground terminal, the first MOS transistor being driven by the reset signal and the second MOS transistor being driven by the temperature detection comparison signal; and a transfer gate that is connected to a connection terminal between the first and second MOS transistors and is driven by the oscillator operation completion signal.

63. The temperature detecting apparatus of claim 38, wherein, in a state in which the temperature detection start signal is enabled, the oscillator enable signal generation unit enables the second oscillator enable signal and the first oscillator reset signal when the temperature detection update signal is enabled and disables the second oscillator enable signal when the oscillator operation completion signal is enabled.

64. The temperature detecting apparatus of claim 63, wherein the oscillator enable signal generation unit is an RS flip-flop in which the temperature detection start signal is used as a clock signal, and the temperature detection update signal and the oscillator operation completion signal are used as input signals.

65. The temperature detecting apparatus of claim 63, wherein the oscillator enable signal generation unit includes:

a first logic element to which the temperature detection update signal and the temperature detection start signal are inputted;

a second logic element to which the temperature detection start signal and the oscillator operation completion signal are inputted;

a third logic element to which an output signal of the first logic element and an output signal of a fourth logic element are inputted and which outputs the second oscillator enable signal;

the fourth logic element to which an output signal of the second logic element and an output signal of the third logic element are inputted; and a second delay unit that delays the second oscillator enable signal by a predetermined period of time and then outputs the first oscillator reset signal.

66. The temperature detecting apparatus of claim 38, wherein the oscillator enable signal generation unit is an RS flip-flop in which the temperature detection start signal is used as a clock signal, and the temperature detection update signal and the oscillator operation completion signal are used as input signals.

67. The temperature detecting apparatus of claim 38, wherein the oscillator enable signal generation unit includes:

a first logic element to which the temperature detection update signal and the temperature detection start signal are inputted;

a second logic element to which the temperature detection start signal and the oscillator operation completion signal are inputted;

a third logic element to which an output signal of the first logic element and an output signal of a fourth logic element are inputted and which outputs the second oscillator enable signal;

the fourth logic element to which an output signal of the second logic element and an output signal of the third logic element are inputted; and a second delay unit that delays the second oscillator enable signal by a predetermined period of time and then outputs the first oscillator reset signal.

68. The temperature detecting apparatus of claim 38, wherein the start signal generation unit is initialized by a power-up signal and outputs the temperature detection start signal in response to an active signal.

69. The temperature detecting apparatus of claim 68, wherein the start signal generation unit includes:

a first MOS transistor that is connected between a power supply terminal and an output terminal and is driven by a power-up signal; and a second MOS transistor that is connected between the output terminal and a ground terminal and is driven by an active signal.

70. The temperature detecting apparatus of claim 38, wherein the start signal generation unit includes:

a first MOS transistor that is connected between a power supply terminal and an output terminal and is driven by a power-up signal; and a second MOS transistor that is connected between the output terminal and a ground terminal and is driven by an active signal.

71. The temperature detecting apparatus of claim 38, wherein the update signal generation unit includes:

at least one doubling unit to which the first oscillating signal is inputted and which doubles the first oscillating signal until the first oscillating signal has a predetermined period and then outputs an oscillator update signal; and a delay unit that delays the oscillator update signal by a predetermined period of time and then outputs the temperature detection update signal.

72. The temperature detecting apparatus of claim 38, wherein the delay unit includes:

a first delay unit that generates the oscillator operation completion signal by using the comparison interval setting signal; and a second delay unit that generates the reset signal by using the comparison interval setting signal.

73. The temperature detecting apparatus of claim 72, wherein the first delay unit generates the oscillator operation completion signal after a delayed signal of the comparison interval setting signal is disabled and then a predetermined period of time passes, and the second delay unit delays the comparison interval setting signal by a period of time longer than in the first delay unit and then generates the reset signal after the comparison interval setting signal is disabled and then a predetermined period of time passes, thereby completing a temperature detection operation.

74. The temperature detecting apparatus of claim 38, wherein the first delay unit generates the oscillator operation completion signal after a delayed signal of the comparison interval setting signal is disabled and then a predetermined period of time passes, and the second delay unit delays the comparison interval setting signal by a period of time longer than in the first delay unit and then generates the reset signal after the comparison interval setting signal is disabled and then a predetermined period of time passes, thereby completing a temperature detection operation.

* * * * *